United States Patent
Kim et al.

(10) Patent No.: US 8,451,554 B2
(45) Date of Patent: May 28, 2013

(54) FLAT PANEL DISPLAY DEVICE AND METHOD FOR PRODUCING THE SAME

(75) Inventors: Deuk-Soo Kim, Suwon-si (KR);
Jeung-Soo Kim, Seongnam-si (KR);
Chung-Woo Suh, Gwacheon-si (KR);
Jeong-Ho Hwang, Seoul (KR);
Sang-Hee Lee, Hwaseong-si (KR);
Kun-Bin Lee, Suwon-si (KR); Ji-Hwan Jang, Seoul (KR); Dong-Won Lee, Suwon-si (KR); Jung-In Han, Seoul (KR); Si-Beak Pyo, Suwon-si (KR)

(73) Assignee: Samsung Display Co., Ltd. (KR)

( * ) Notice: Subject to any disclaimer, the term of this patent is extended or adjusted under 35 U.S.C. 154(b) by 427 days.

(21) Appl. No.: 12/701,635

(22) Filed: Feb. 8, 2010

(65) Prior Publication Data
US 2010/0202077 A1    Aug. 12, 2010

(30) Foreign Application Priority Data

Feb. 9, 2009 (KR) .......................... 10-2009-0010230

(51) Int. Cl.
*G02B 5/00* (2006.01)
*G02F 1/1339* (2006.01)

(52) U.S. Cl.
USPC ........................................... 359/894; 349/155

(58) Field of Classification Search
None
See application file for complete search history.

(56) References Cited

FOREIGN PATENT DOCUMENTS

| JP | 2007-47621 | * | 2/2007 |
|---|---|---|---|
| JP | 2007-047621 A | | 2/2007 |
| KR | 10-2007-0109183 A | | 11/2007 |
| KR | 10-2007-0117189 A | | 12/2007 |

* cited by examiner

*Primary Examiner* — Jade R Chwasz
(74) *Attorney, Agent, or Firm* — Cantor Colburn LLP

(57) ABSTRACT

A flat panel display device includes a display module, a protection window member and a layer disposed in an area between the protection window member and a display area of the display module. The protection window member includes a stepped portion within which the layer is disposed. The stepped portion may include a recess or a plurality of layers.

6 Claims, 3 Drawing Sheets

FLAT PANEL DISPLAY DEVICE AND METHOD FOR PRODUCING THE SAME

This application claims priority to Korean Patent Application No. 10-2009-0010230, filed on Feb. 9, 2009, and all the benefits accruing therefrom under 35 U.S.C. §119, the contents of which in its entirety are herein incorporated by reference.

BACKGROUND OF THE INVENTION

1. Field of the Invention

The present invention relates to a flat panel display device and a method for producing the same. More particularly, the present invention relates to a flat panel display device with good visibility and a method for producing the same.

2. Description of the Related Art

Flat panel display devices, for example a display device with a liquid crystal display panel, a plasma display panel, or an organic light emitting display panel, are widely used in various kinds of displays.

Flat panel display devices, for example, mobile display devices with flat panel displays, generally include a protection window. The protection window protects the display panel from physical and chemical damages by covering a display area of a display panel.

A conventional flat panel display device with a protection window generally has an air gap between the protection window and a display panel. The refractive indices of the protection window and the display panel are greater than the refractive index of the air. When a light ray is passing through two layers contacting each other and having different refractive indices, a portion of the light ray is reflected in the boundary of the two layers. This phenomenon can be explained by Snell's Law.

In the conventional flat panel display device, some portion of light rays passing through the display panel, the air gap and the protection window respectively are reflected in boundary areas where the display panel meets the air gap, and where the air gap meets the protection window. These reflections cause loss of visibility in the flat panel display device.

Developers in this field try to provide a flat panel display having a protection window with improved visibility, by removing an air gap between the protection window and a display panel. The display panel may be attached to the protection window by a transparent film or resin. But, there are difficulties in removing the air gap by using the transparent film or resin.

The transparent film easily slips or comes apart from the protection window, so possibilities of defects occurring or reducing visibility is increased.

Some problems with the prior art include that the resin easily slides outside the protection window, and it is difficult to control the uniformity of the thickness of the resin because of fluidity of the resin.

BRIEF SUMMARY OF THE INVENTION

An exemplary embodiment of the present invention provides a flat panel display device including a display module, a protection window member and a layer disposed in an area between the protection window member and a display area of the display module. The protection window member includes a recess disposed extending from a rear surface of the protection window member. Edges of the layer are disposed within the recess of the protection window member.

An exemplary embodiment of the present invention provides a flat panel display device including a display module, a protection window member and a layer disposed in an area between the protection window member and a display area of the display module. The protection window member includes a first layer disposed on a rear surface of the protection window member, the first layer including a first opening, and a second layer disposed on the first layer, the second layer including a second opening. The first opening is smaller than the second opening, and edges of the layer disposed between the protection window member and the display area of the display module, are disposed within the first and second openings.

An exemplary embodiment of a method for producing a protection window member for a flat panel display device of the present invention includes providing a mold corresponding to an inversed shape of the protection window member, forming a protrusion corresponding to an inversed shape of a recess disposed extending inward from a rear surface of the protection window member, in the mold, and injecting a molten plastic at high pressure into the mold.

An exemplary embodiment of a method for producing a flat panel display device of the present invention includes providing a protection window member, disposing a first layer on a rear surface of the protection window member, and forming a first opening in the first layer, disposing a second layer on the first layer, and forming a second opening in the second layer, a planar area of the second opening being greater than a planar area of the first opening, forming a third layer on the rear surface of the protection window member, and adhering a front surface of a display module to the third layer. Edges of the third layer are disposed within the first and second openings.

BRIEF DESCRIPTION OF THE DRAWINGS

The above and other aspects, features, and advantages of the present invention will become more apparent by describing in detail the exemplary embodiments thereof with reference to the attached drawings in which.

DETAILED DESCRIPTION OF THE INVENTION

Figure 1:
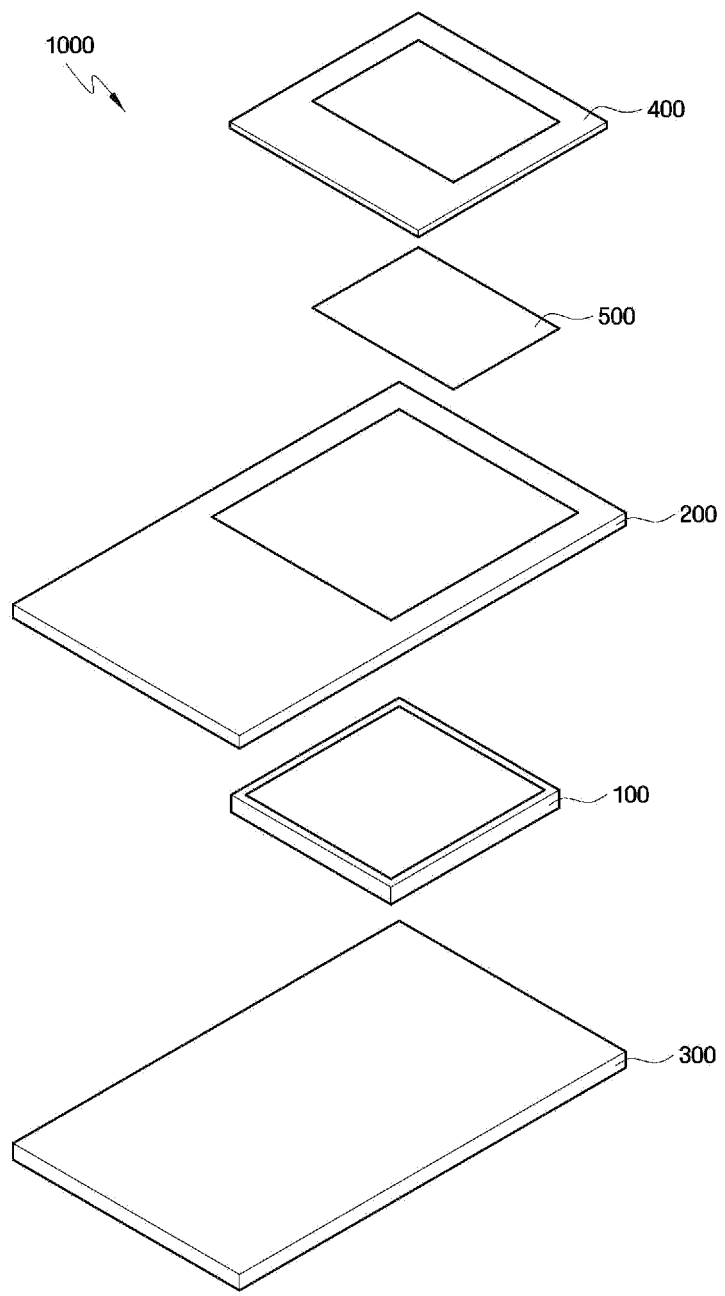
FIG. 1 is an exploded perspective view showing an exemplary embodiment of a flat panel display device according to the invention.

Hereinafter, embodiments of the invention will be described in detail with reference to the accompanying drawings. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element, it can be directly on, connected or coupled to the other element or layer or intervening elements or layers may be present. Like numbers refer to like elements throughout. As used herein, the term "and/or" includes any and all combinations of one or more of the associated listed items.

It will be understood that, although the terms first, second, third etc. may be used herein to describe various elements, components, regions and/or sections, these elements, components, regions and/or sections should not be limited by these terms. These terms are only used to distinguish one element, component, region or section from another element, component, region or section. Thus, a first element, component, region or section discussed below could be termed a second element, component, region, layer or section without departing from the teachings of the invention.

Spatially relative terms, such as "below," "rear," "above," "front" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "rear" than other elements or features would then be oriented "above" or "front" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2:
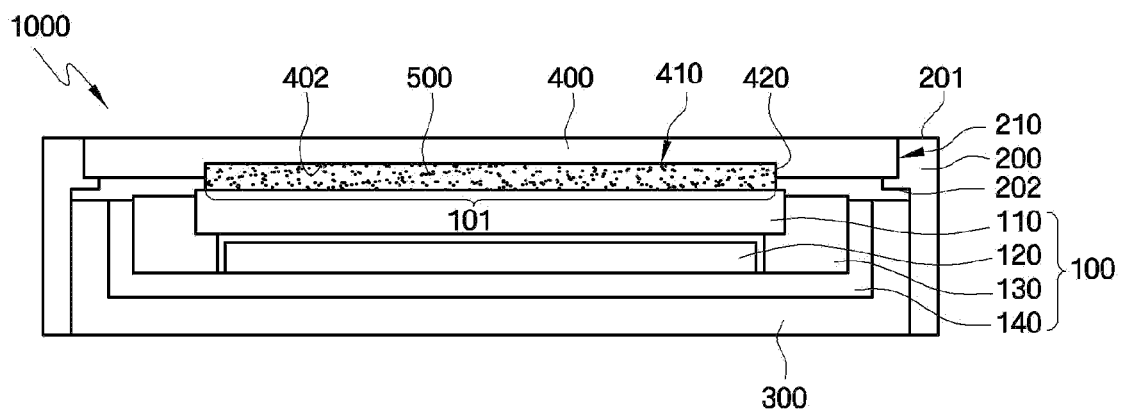
FIG. 2 is a cross-sectional view showing the flat panel display device of FIG. 1.

FIG. 1 is an exploded perspective view showing an exemplary embodiment of a flat panel display device according to the invention, and FIG. 2 is a cross-sectional view showing the flat panel display device of FIG. 1.

Referring to FIGS. 1 and 2, the flat panel display device 1000 includes a display module 100, a front case 200, a rear case 300, a protection window member 400 and a protector member (e.g., sheet) 500. The protection window member 400 may form the frontmost element or surface of the flat panel display device 1000, and the rear case 300 may form the rearmost element or surface of the flat panel display device 1000.

The display module 100 may include a liquid crystal display panel 110, a backlight unit 120, a mold frame 130 and a receiving container 140. The backlight unit 120 may include a light generating unit generating a light, and a light guiding unit guiding the light to the liquid crystal display panel 110. The mold frame 130 and receiving container 140 together may form a receiving space therebetween, and may receive the backlight unit 120 and the liquid crystal display panel 110 therein. A printed circuit board (not shown) electrically connected to the liquid crystal display panel 110 and the light generating unit, for driving the liquid crystal display panel 110 and the light generating unit, may be disposed on a rear surface of the receiving container 140. In alternative exemplary embodiments of the invention, various kinds of display modules, such as an organic light emitting diode module, a plasma display module or a field emission display module, may be substituted for the display module 100.

The front case 200 and the rear case 300 are coupled to each other and receive the display module 100. The front case 200 has an opening or window which exposes a display area of the liquid crystal display panel 110. The window in the front case 200 is spaced apart from all edges of the front case 200 and is an enclosed opening completely penetrating a thickness of the front case 200. The front case 200 solely defines the enclosed window opening.

The protection window member 400 is disposed in the opening of the front case 200. The protection window member 400 may be disposed on a first groove 210 disposed on a front surface 201 of the front case 200. The first groove 210 corresponds to a first peripheral area of the opening of the front case 200, and defines a first outer boundary of the opening. The protection window member 400 may be disposed extending an entire of a distance between opposing surfaces of the first outer boundary of the opening in the front case 200. The protection window member 400 may directly contact both an inner (vertical) surface of the first groove 210 and an upper (horizontal) surface of a stepped portion defined by the first groove 210.

A second groove may be disposed on a rear surface 202 of the front case 200 corresponding to a second peripheral area of the opening, and defines a second outer boundary of the opening. With this structure, end face portions of the protection window member 400 are attached to the first groove 210, so the protection window member 400 is fixed to the front case 200 and disposed in the opening of the front case 200.

In exemplary embodiments, the protection window member 400 may include a plastic and/or a glass substrate. The protection window 400 may include a film with flexibility and/or elasticity.

The protector member 500 may include a transparent film attached to and directly contacting both a portion of a rear surface 402 of the protection window member 400, and a portion of a front surface of the display module 100. The transparent film 500 may partially fill an area between the protection window member 400 and the display module 100, such as to remove an air gap between a display area 101 of the display module 100 and an area of the protection window member 400 corresponding to the display area 101. No portion of the transparent film 500 may be disposed in a remaining area between the protection window member 400 and the display module 100, as illustrated in FIG. 2. That is, the transparent film 500 may overlap only the display area 101, and not the remaining area between the protection window member 400 and the display module 100.

The transparent film 500 may be considered as "corresponding" to the display area 101 substantially in shape, size and/or positional placement. In an exemplary embodiment, edges of the transparent film 500 may extend to align with boundaries of the display area 101, may extend further than boundaries of the display area 101 towards an outer boundary of the display module 100, or may extend less than boundaries of the display area 101. The transparent film 500 is a single unitary indivisible member.

Referring again to FIG. 2, the protection window member 400 includes a recess 410 receiving the transparent film 500, so the rear surface 402 of the protection window member 400 includes stepped portions 420. A portion of the rear surface 402 at the recess 410 is disposed closer to a front surface of the protection window member 400 than a portion of the rear surface 402 not overlapping with the transparent film 500. Offset portions of the rear surface 402 form the stepped portions 420.

The protection window member 400, including the stepped portions 420, is a single unitary indivisible member. In a plan view, the recess 410 is spaced apart from all edges of the protection window member 400, and is considered an enclosed opening partially penetrating a thickness of the protection window member 400. The protection window member 400 solely defines the enclosed recess 410 opening. Referring to FIG. 1, the solid line shape spaced apart from all of the edges of the protection window member 400 indicates a position of the recess 410.

Conventional flat panel display devices with a transparent film attached to a display module and a protection window are exposed to various kinds of possible damage. In the assembly process of the flat panel display devices, an aligning jig is needed to attach the transparent film to the protection window to prevent the transparent film from being misaligned, because there is no guide formed on the protection window. Therefore additional equipment and a complicated assembly process are required. Also, the ductility of the transparent film may cause an unintentional shift of the transparent film on the protection window.

Unifying separated parts into one part in a preparing method of the assembly process may be helpful to simplify the assembly process of a display device by reducing assembling parts in actual assembling steps. In one exemplary embodiment of an assembling process of the flat panel display devices, unifying the protection window member and the transparent film may be helpful to improve productivity of the assembly process, but due to the ductility of the transparent film the union of the two parts may cause several kinds of defects, such as shifting of the transparent film or poor adhesion properties caused by instability of an adhesion between the two parts. The defects described above need to be reprocessed, which includes the process of detaching the transparent film and reattaching the transparent film while realigning. The durability of the conventional transparent film is not strong enough to bear the several reprocessing processes, for example, adhesion strength of a detached area of a transparent film decreases radically, so the reprocessing causes loss of production time and cost.

The single unitary indivisible protection window member 400 of the illustrated embodiment includes a recess 410, and the transparent film 500 is disposed directly on and within the recess 410. The depth of the recess 410, taken in a first direction perpendicular to a plane of the protection window member 400, is smaller than a thickness of the transparent film 500 in the first direction. As illustrated in FIG. 2, a portion of the transparent film 500 protrudes outwardly (e.g., in the first direction towards the rear case 300) from the rear surface 402 of the protection window member 400 not overlapping the transparent film 500, and is able to directly contact an uppermost surface of the display module 100.

The stepped portions 420 of the protection window member 400 face side surfaces of the transparent film 500. The stepped portions 420 may function as a guide during a process including attaching the transparent film 500 to the protection window member 400. The stepped portions 420 make it possible to attach and align the transparent film 500 to the protection window member 400 correctly and easily, without using an aligning jig, so it is possible to reduce the time and equipment for the assembly process.

The stepped portions 420 may also function as a stopper for the transparent film 500. The transparent film 500 is not shifted over a boundary defined by the stepped portions 420, because the stepped portions 420 provide a resistance force to the transparent film 500, against a force pulling the transparent film 500 when the stepped portions 420 directly contact the side surface of the transparent film 500. With this structure, the stepped portions 420 prohibit the transparent film 500 from an unintentional shift (e.g., in a second or horizontal direction), and provide a more stable adhesion state between the transparent film 500 and the protection window member 400.

The stepped portions 420 of the protection window member 400 define a predetermined receiving area for the protector member 500 (e.g., transparent film), and reduce or effectively prevent the protector member 500 from slipping or coming apart from the protection window member 400, so possibilities of defects occurring or reducing visibility of the display device is decreased.

The stepped portions 420 of the protection window member 400 may protect the side surface portions of the transparent film 500 from being damaged from unintentional physical contact with other objects, such as operator's hands, particles and sharp edges of equipment for manufacturing, during the assembly process, by covering and overlapping edges and a portion of the side surface portions of the transparent film 500.

With the improved features including the stepped portions 420 of the single unitary indivisible protection window member 400 described above, unifying and assembling the transparent film 500 and the protection window 400 together according to the illustrated embodiment of the invention in a preparing method of the assembly process, is possible without defects occurring, such as shifting of the transparent film 500 during the assembly process.

According to the illustrated embodiment of the invention, a flat panel display device with reduced overall thickness can be provided. It is possible to reduce the total thickness of the flat panel display device 1000 in the first direction, because a portion of the transparent film 500 disposed in the recess 410 does not have influence on the total thickness of the flat panel display device 1000.

In an exemplary embodiment, the protection window member 400 may be made by injection molding. Injection molding is a manufacturing process for producing parts from plastic materials. Molten plastic is injected at high pressure into a mold which is the inverse of the protection window member's 400 shape. The recess 410 may be formed by disposing a protrusion in the mold. The protrusion is the inverse of the recess's shape. Alternatively, the recess 410 may be formed by removing a portion of the protection window 400. The removed portion defines the recess 410 of the protection window member 400.

Figure 3:
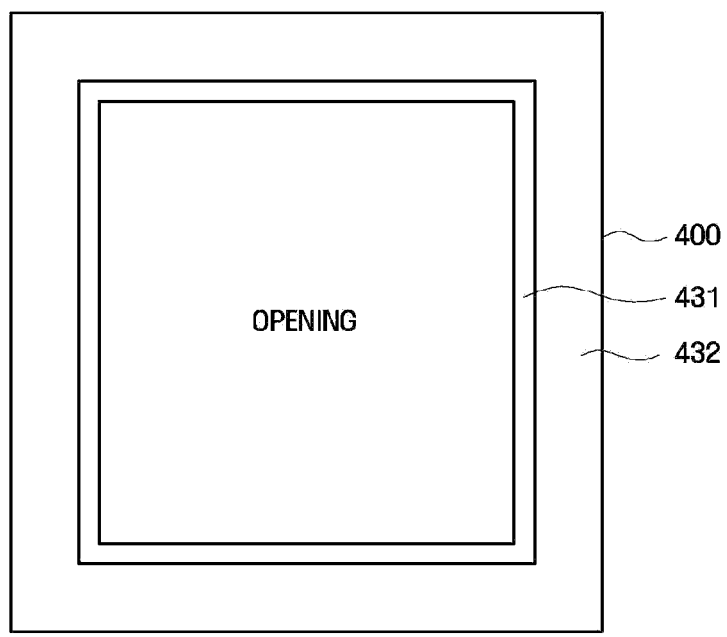
FIG. 3 is a plane view showing an exemplary embodiment of a rear surface of a protection window according to the invention.

FIG. 3 is a plane view showing an exemplary embodiment a rear surface of a protection window member according to the invention, and FIG. 4 is a cross-sectional view showing a flat panel display device including the protection window member shown in FIG. 3.

Figure 4A:
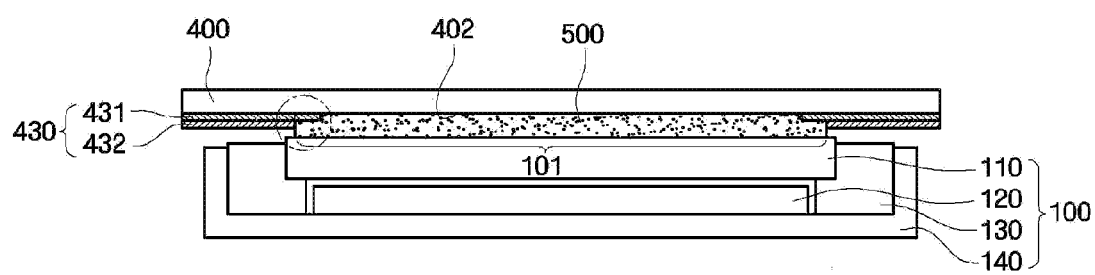
FIGS. 4A and 4B are a cross-sectional views showing an exemplary embodiment of a flat panel display device including the protection window shown in FIG. 3.
Figure 4B:
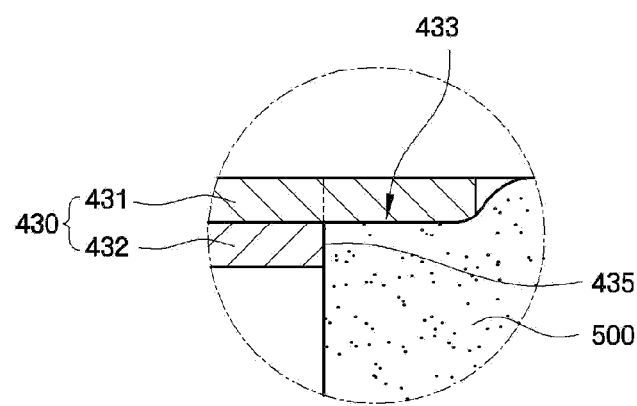

Referring to FIGS. 3, 4A and 4B, the protection window member 400 includes a plurality of ink layers 430 disposed on a rear surface 402 of the protection window member 400. The ink layers 430 improve the outward appearance of a flat panel display device by covering and overlapping peripheral areas of a display module 100, without any additional covering part disposed on a front surface of the protection window member 400.

The plurality of ink layers 430 includes a first layer 431 disposed, such as by printing a first ink, on the rear surface 402 of the protection window member 400, and a second layer 432 disposed, such as by printing a second ink, on the first ink layer 431. The first ink layer 431 is disposed between the second ink layer 432 and the rear surface 402.

Referring to FIG. 3, the first ink layer 431 and the second ink layer 432 of the protection window member 400 each include an opening. In the plan view, an area and dimension of the first opening of the first ink layer 431 is smaller than an area and dimension of the second opening of the second ink layer 432, so at least a portion of the first ink layer 431 adjacent to the first opening of the first ink layer 431 is not overlapped by the second ink layer 432. That is, the portion of the first ink layer 431 adjacent to the first opening is exposed by the larger second opening in the second ink layer 432. The first and second openings in the first and second ink layers 431 and 432, are each spaced apart from all edges of the first and second ink layers 431 and 432 in the plan view. The first and second openings are each considered an enclosed opening completely penetrating a thickness of the first and second ink layers 431 and 432. The first and second ink layers 431 and 432 solely define the enclosed first and second openings, respectively.

A thickness of one ink layer may be generally greater than about 5 micrometers and less than about 10 micrometers. An ink layer may include pin-hole defects or scratches. The pin-hole defect is a hole of the ink layer which partially or completely penetrates the thickness of the ink layer. The hole in the ink layer may occur when a foreign or contaminant particle is initially disposed on the rear surface of the protection window member before disposing material (e.g., ink) on the rear surface of the protection window. The particle can easily move or deform on the rear surface of (e.g., fall over) the protection window. When the particle falls over with an ink layer printed over the particle, the area where the particle is disposed forms the hole in the ink layer. The quality of the outward appearance of the flat panel display device decreases when there is a hole disposed on the ink layer, because the hole may be acknowledged by viewers. Also, the ink layer may be scratched by unintentional physical contact with other matters, such as operator's hands, particles and sharp edges of equipment, during the assembly process, because the ink layer is not a solid layer.

According to the illustrated embodiment of the invention, the plurality of ink layers 430 includes the first ink layer 431 and the second ink layer 432 sequentially disposed on the rear surface 402 of the protection window member 400. The second ink layer 432 disposed (e.g., by printing) on the first ink layer 431, effectively protects the first ink layer 431. The second ink layer 432 may fill up pin-holes disposed in the first ink layer 431 when the second ink layer 432 is disposed on the first layer 431.

The second layer 432 may include a scratch during an assembly process, but the scratch does not have an effect on the outward appearance of the flat panel display device if the scratch is not extended to contact and influence the first ink layer 431. Viewers of the flat panel display device watch images of the display module 100 through the protection window member 400. With respect to the plurality of ink layers 430, viewers only see a front surface of the first ink layer 431 through the protection window member 400. The front surface of the first ink layer 431 faces and contacts the rear surface 402 of the protection window member 400. The second ink layer 432 effectively functions as a protecting layer for the first ink layer 431, so it improves the outward appearance of the flat panel display device.

Referring again to FIGS. 4A and 4B, the transparent film 500 is disposed directly on, contacting and adhered to both the rear surface 402 of the protection window member 400 and a front surface of the display module 100, to remove an air gap between a display area 101 of the display module 100 and an area of the protection window member 400 corresponding to the display area 101. Edges of the transparent film 500 are disposed overlapping and directly on the portion of the first ink layer 431 adjacent to the first opening of the first ink layer 431 exposed from the second ink layer 432. The exposed portion of the first ink layer 431 is not overlapped by any portion of the second ink layer 432.

In the illustrated embodiment, all four edges of the transparent film 500 are disposed overlapping and directly on the exposed portion of the first ink layer 431. The four outer edges of the transparent film 500 overlap the first ink layer 431, but do not overlap any portion of the second ink layer 432. In an exemplary embodiment, edges of the transparent film 500 may extend to align with boundaries of the display area 101 and/or boundaries of the second opening in the second ink layer 432, in the plan view.

Referring to FIG. 4B, an enlarged view of an outer boundary of the transparent film 500 and a boundary of the first opening in the first ink layer 431 are illustrated. Portions of the transparent film 500 may contact an inner face surface at both the first and second openings of the first and second ink layers 431 and 432, respectively. In a transition area from the rear surface 402 of the protection window member, to the rear surface 433 of the first ink layer 431, a portion of the transparent film 500 may be curved. The curved portion of the transparent film 500 may be specifically formed to be curved, or may be the result of deformation of the transparent film 500 in the process of disposing the transparent film 500 on the protection window member 400.

Edges of the second ink layer 432 directly adjacent to the second opening of the second ink layer 432, form stepped portions with the exposed portion of the first ink layer 431. A thickness of the stepped portion is the same as a thickness of the second ink layer 432, where the thicknesses are taken in the first direction perpendicular to a plane of the protection window member 400.

The stepped portions defined by the first and second ink layers 431 and 432 in FIGS. 4A and 4B, effectively function as the stepped portions 420 of the exemplary embodiment of the invention in FIGS. 1 and 2. In the stepped portion in FIGS. 4A and 4B, the edges of the second ink layer 432 directly adjacent to the second opening of the second ink layer 432, function as a guide during a process of attaching the transparent film 500 to the protection window member 400. Also, the stepped portion in FIGS. 4A and 4B may also function as a stopper for the transparent film 500, similar to the stepped portion 420 in FIG. 1.

The stepped portions defined by first and second ink layers 431 and 432 of the protection window member 400 define a predetermined receiving area for the protector member 500 (e.g., transparent film), and reduce or effectively prevent the protector member 500 from slipping or coming apart from the protection window member 400, so possibilities of defects occurring or reducing visibility of the display device is decreased.

As described above, the edges of the transparent film 500 are disposed on an area of the first ink layer 431 which is not overlapped by the second ink layer 432. In an exemplary embodiment it is possible to dispose the edges 435 of the transparent film 500 directly on the rear surface of the protection window 402, but the portion of the first ink layer 431 which is not overlapped by the second ink layer 432, gives more tolerance for an assembly process.

Operators or machines that attach the transparent film 500 to the protection window member 400, need not try to check whether all edges 435 of the transparent film 500 meet the inner boundaries of openings because the edges 435 of the transparent film 500 is not recognized in a viewing side of the flat panel display device. Referring to FIGS. 4A and 4B, the viewing side is above the protection window member 400, while a rear side is below the receiving container 140.

In the illustrated embodiment, in a plan view, the edges 435 of the transparent film 500 are hidden by the first ink layer 431 from the viewing side. Consequently, a marginal area for the assembly process of attaching the transparent film 500 to the protection window member 400 is increased as large as the area of the exposed portion of the first ink layer 431.

In contrast, if the display device includes only a single ink layer (e.g., 432) having a total thickness of the first and second ink layers 431 and 432 in FIGS. 4A and 4B, and edges 435 of the transparent film 500 are disposed only meeting the inner boundaries of an opening of the single second layer 432, the edges 435 are easily detached from the second layer 432. In this structure, the edges 435 of the transparent film 500 may be excessively bent because of the increased thickness of the single ink layer 432, which is as thick as twice the thickness of the first and second ink layers 431 and 432. When the edges 435 of the transparent film 500 are bent, the edges 435 of the transparent film 500 are easily detached from the single second layer 432. Consequently, air may flow through the detached area of the transparent film 500 and form bubbles between the transparent film 500 and the protection window member 400, which negatively impacts the display quality of the display device.

In alternative embodiments, the transparent film 500 described above may be substituted as a liquid resin. The liquid resin partially or completely occupies an area between a display module and a protection window member which corresponds to the display area 101, to decrease or remove an air gap between the two parts. In an exemplary embodiment, no portion of liquid resin may be disposed in a remaining area between the protection window member 400 and the display module 100, the remaining area excluding the display area 101. That is, the liquid resin may be disposed between the display module and a protection window member, and overlap only the display area 101, while not overlapping the remaining area between the protection window member and the display module.

The stepped portions of the protection window member in the illustrated embodiments of the invention reduce or effectively prevent the liquid resin from being spilled outside of the protection window. In an exemplary embodiment of a method of producing a display device, during an assembly process of a flat panel display device with the liquid resin, the liquid resin is disposed (e.g., poured) on the protection window member, and the stepped portions of the protection window member guide the liquid resin and limit movement of the liquid resin into a predetermined area. After the liquid resin is disposed on the protection window member, the display module is coupled with the protection window member while the liquid resin occupies an area between the display module and the protection window. The liquid resin may be hardened after it fills up the area between the two parts.

The stepped portions 420 of the protection window member 400 in FIG. 1, or the stepped portions of the protection window member 400 defined by first and second ink layers 431 and 432 in FIGS. 3, 4A and 4B, define a predetermined receiving area for the protector member 500 (e.g., liquid resin), reduce or effectively prevent the protector member 500 from sliding outside the protection window member 400, and make it possible to control the uniformity of a thickness of the resin because of fluidity of the resin.

Although the invention has been described with reference to the accompanying drawings and the illustrated embodiments, the invention is not limited thereto, but is defined by the appended claims. Therefore, it should be noted that various changes and modifications may be made by those skilled in the art without departing from the technical spirit and scope of the appended claims.

What is claimed is:

1. A flat panel display device, comprising:
   a display module comprising a display area;
   a protection window member overlapping the display module, and including a recess extending from a rear surface of the protection window member, the recess including a surface facing the display module; and
   a layer in an area between the protection window member and the display area of the display module,
   wherein
   edges of the layer are within the recess of the protection window member, and
   an entirety of the surface of the recess is substantially flat.

2. The flat panel display device according to claim 1, wherein the recess of the protection window member comprises a stepped portion disposed at a peripheral area of the recess.

3. The flat panel display device according to claim 2, wherein the layer comprises a transparent film.

4. The flat panel display device according to claim 3, wherein a total thickness of the transparent film is larger than a thickness of the stepped portion.

5. The flat panel display device according to claim 3, wherein the stepped portion faces a side surface of the transparent film.

6. The flat panel display device according to claim 2, wherein the layer comprises a liquid resin.

* * * * *